(12) United States Patent
Hobbs, Jr.

(10) Patent No.: US 8,454,046 B1
(45) Date of Patent: Jun. 4, 2013

(54) PLATFORM ASSEMBLY FOR A TOWED IMPLEMENT

(75) Inventor: Kenneth Patrick Hobbs, Jr., Louisville, KY (US)

(73) Assignee: Brinly-Hardy Company, Jeffersonville, IN (US)

( * ) Notice: Subject to any disclaimer, the term of this patent is extended or adjusted under 35 U.S.C. 154(b) by 355 days.

(21) Appl. No.: 12/911,050

(22) Filed: Oct. 25, 2010

Related U.S. Application Data

(60) Provisional application No. 61/255,526, filed on Oct. 28, 2009.

(51) Int. Cl.
*B60D 1/155* (2006.01)

(52) U.S. Cl.
USPC .......................................................... 280/488

(58) Field of Classification Search
USPC ................. 280/204, 488, 292, 79.11, 656, 63
See application file for complete search history.

(56) References Cited

U.S. PATENT DOCUMENTS

| | | | | |
|---|---|---|---|---|
| 1,492,491 A * | 4/1924 | Swope | ........................... | 280/444 |
| 1,495,306 A * | 5/1924 | Holmes | ........................... | 280/444 |
| 1,864,324 A * | 6/1932 | Stedman | ........................ | 280/488 |
| 1,915,866 A * | 6/1933 | Orelind | ........................... | 172/205 |
| 2,105,585 A * | 1/1938 | Currie | ........................... | 280/473 |
| 2,292,488 A * | 8/1942 | Stevens, Jr. | .................... | 172/325 |
| 2,329,380 A * | 9/1943 | Arehart | ........................... | 280/484 |
| 2,338,334 A * | 1/1944 | Kastenschmidt | .............. | 280/483 |
| 2,596,902 A * | 5/1952 | Krause | ........................... | 172/274 |
| 2,792,238 A * | 5/1957 | Schaa | ........................... | 280/458 |
| 3,623,750 A * | 11/1971 | Allen | .......................... | 280/455.1 |
| 3,998,471 A * | 12/1976 | Lutchemeier | ................. | 280/492 |
| 6,488,291 B1* | 12/2002 | Bellis, Jr. | ...................... | 280/32.7 |
| 7,040,556 B2* | 5/2006 | Jones | ........................... | 239/663 |
| 7,484,749 B1* | 2/2009 | Doyle et al. | ................ | 280/460.1 |
| 8,029,007 B2* | 10/2011 | Jones et al. | ............... | 280/47.131 |
| 2003/0178512 A1* | 9/2003 | Kenny | ........................... | 239/650 |
| 2006/0054722 A1* | 3/2006 | Jones | ............................ | 239/663 |
| 2007/0125581 A1* | 6/2007 | Busuttil et al. | ............. | 180/24.02 |

* cited by examiner

*Primary Examiner* — Tashiana Adams
(74) *Attorney, Agent, or Firm* — Stites & Harbison, PLLC; David W. Nagle, Jr.

(57) ABSTRACT

A platform assembly for a towed implement comprises a bracket for securing the platform assembly to a vehicle; a frame connected to the bracket for supporting the towed implement; one or more wheels connected to the frame for contacting the underlying ground surface; and a biasing means for providing an upward force that counteracts a downward force applied to the rear of the vehicle by the platform assembly and the towed implement.

10 Claims, 5 Drawing Sheets

PLATFORM ASSEMBLY FOR A TOWED IMPLEMENT

CROSS-REFERENCE TO RELATED APPLICATIONS

The present application claims priority to U.S. Provisional Patent Application Ser. No. 61/255,526 filed on Oct. 28, 2009, the entire disclosure of which is incorporated herein by reference.

TECHNICAL FIELD

The present invention relates to a platform assembly for a towed implement, such as a broadcast spreader, sprayer, cart bed, or other lawn or turf implement towed behind a mower, riding mower, zero-turn radius mower (ZTR), tractor, truck, all-terrain vehicle (ATV), or other vehicle.

BACKGROUND OF THE INVENTION

Various implements are often towed behind vehicles in caring for and maintaining a lawn, in farming applications, in applying salt or chemicals to icy surfaces, and in other circumstances. For example, broadcast spreaders and sprayers are two common implements that are towed behind vehicles, including, but not limited to, mowers, riding mowers, zero-turn radius mowers (ZTR), tractors, trucks, and all-terrain vehicles (ATV). Irrespective of the particular implement that is being used, when towing an implement behind a vehicle, there is a significant load on the rear of the vehicle as a result of the weight of the towed implement. In this regard, the term "tongue weight" is commonly used to refer to the downward force that the towed implement applies to the hitch or bracket at the rear of the vehicle. If the tongue weight is too great, the maneuverability of the vehicle may be adversely affected.

SUMMARY OF THE INVENTION

The present invention is a platform assembly for a towed implement, such as a broadcast spreader, sprayer, cart bed, or other lawn or turf implement towed behind a mower, riding mower, zero-turn radius mower (ZTR), tractor, truck, all-terrain vehicle (ATV), or other vehicle.

A platform assembly made in accordance with the present invention generally comprises: a bracket or other means for securing the platform assembly to a vehicle; a frame connected to the bracket for supporting the implement that is to be towed behind the vehicle; one or more wheels or casters connected to the frame for contacting the underlying ground surface; and a biasing means for providing an upward force that counteracts the downward force (or tongue weight) applied to the rear of the vehicle by the platform assembly and the towed implement.

In one exemplary embodiment, extending from the front face of the bracket are pairs of rearwardly extending support members, each pair effectively forming a shackle. Extending from the frame are one or more tow bars. Each of these tow bars terminates in a tube section that is oriented perpendicular to the respective tow bar. Accordingly, the tube section of each tow bar can be placed in registry with holes defined by one of the pairs of support members, with a clevis pin then inserted to create a pin connection. As a result, the tow bars and the frame can pivot about the horizontal axis defined by the clevis pin(s), thus allowing for rotational movement as the platform assembly moves over uneven ground. Furthermore, the use of at least two tow bars prevents side-to-side movement during turning, thus preventing any jack-knifing of the platform assembly relative to the vehicle.

The platform assembly also includes a biasing means for providing an upward force that counteracts the downward force (or tongue weight) applied to the rear of the vehicle. Such an upward force is not intended to fully counteract the downward force applied to the rear of the vehicle by the platform assembly and the towed implement, but rather only to counteract a portion of the force and reduce the load on the rear of the vehicle.

In one exemplary embodiment, the biasing means is comprised of a spring and an associated handle for manipulating the spring. The handle is pivotally connected to the bracket and can rotate about a substantially horizontal axis. The spring is connected, at one end, to a lower portion of the handle, which is positioned below the tow bars. At the opposite end, the spring is connected to the frame, such that the spring extends along a diagonal axis between the handle and the frame. When installed, the spring is compact and unstretched. However, by rotating the handle downward, the spring is stretched, increasing the potential energy in the spring. With respect to the rotational movement of the handle and the stretching of the spring, the handle can be locked into a second position in which the spring is stretched by a pin or other mechanical means. In any event, as a result of the stretching of the spring in this manner, an upward force is applied at the bracket where the platform assembly is connected to the vehicle. This upward force counteracts the downward force (or tongue weight) applied to the rear of the vehicle by the platform assembly and the towed implement. In other words, the tongue weight that is applied to the vehicle as a result of the connection of the platform assembly and the towed implement is effectively reduced.

DETAILED DESCRIPTION OF THE INVENTION

The present invention is a platform assembly for a towed implement, such as a broadcast spreader, sprayer, cart bed, or other lawn or turf implement towed behind a mower, riding mower, zero-turn radius mower (ZTR), tractor, truck, all-terrain vehicle (ATV), or other vehicle.

Figure 1:
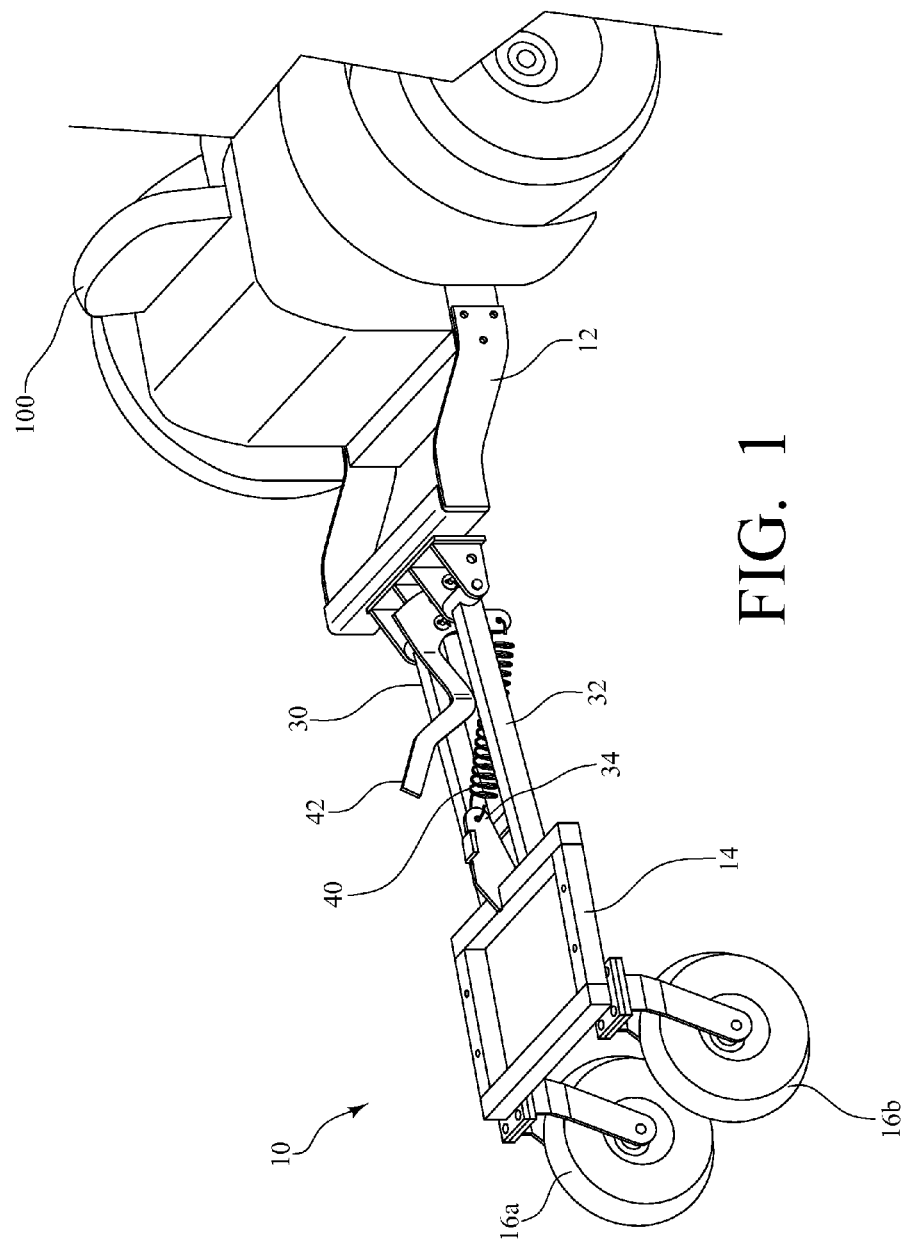
FIG. 1 is a perspective view of an exemplary platform assembly for a towed implement made in accordance with the present invention.
Figure 2:
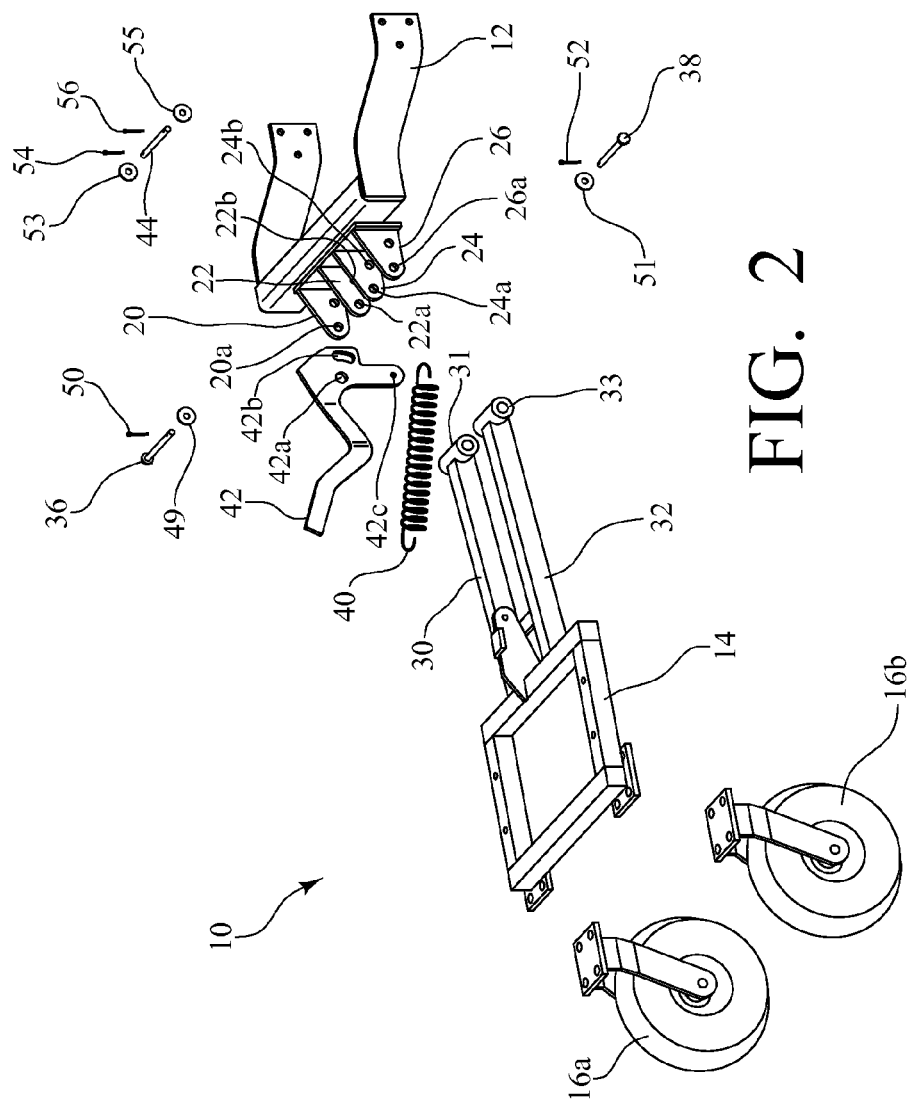
FIG. 2 is an exploded perspective view of the exemplary platform assembly of FIG. 1.

Referring first to FIGS. 1 and 2, an exemplary platform assembly 10 made in accordance with the present invention generally comprises: a bracket 12 or other means for securing the platform assembly to a vehicle 100; a frame 14 connected to the bracket 12 for supporting the implement that is to be towed behind the vehicle 100; one or more wheels or casters 16a, 16b connected to the frame 14 for contacting the underlying ground surface; and a biasing means for providing an upward force that counteracts the downward force (or tongue weight) that is applied to the rear of the vehicle 100 by the platform assembly 10 and the towed implement.

Referring still to FIGS. 1 and 2, in this exemplary embodiment, the bracket 12 includes two side appendages, with each of these side appendages defining one or more holes such that the bracket 12 can be secured to a vehicle 100 using bolts or similar fasteners (not shown). Of course, various other means could be employed to secure the platform assembly 10 to a vehicle depending on the structure of the vehicle without departing from the spirit and scope of the present invention.

Extending from the front face of the bracket 12 are two pairs of rearwardly extending support members 20, 22, 24, 26, each pair (20,22 and 24, 26) effectively forming a shackle. Extending from the frame 14 are two tow bars 30, 32. Each of these tow bars 30, 32 terminates in a tube section 31, 33 that is oriented perpendicular to the respective tow bar 30, 32. Accordingly, the tube section 31 of the first tow bar 30 can be placed in registry with holes 20a, 22a defined by one of the pairs of support members 20, 22, with a clevis pin 36 then inserted through the hole 20a defined by the first support member 20, through the tube section 31 of the first tow bar 30, and through the hole 22a defined by the second support member 22, thus creating a pin connection that is secured by a washer 49 and a cotter pin 50. Similarly, the tube section 33 of the second tow bar 32 can be placed in registry with holes 26a, 24a defined by the other of the pairs of support members 24, 26, with a second clevis pin 38 then inserted through the hole 26a defined by the fourth support member 26, through the tube section 33 of the second tow bar 32, and through the hole 24a defined by the third support member 24, thus creating another pin connection that is secured by a washer 51 and a cotter pin 52. Of course, as a result of such pin connections, the tow bars 30, 32 and the frame 14 can pivot about the horizontal axis defined by the clevis pins 36, 38, thus allowing for rotational movement as the platform assembly 10 moves over uneven ground. Furthermore, the use of two tow bars 30, 32 prevents side-to-side movement during turning, thus preventing any jack-knifing of the platform assembly 10 relative to the vehicle 100.

Referring still to FIGS. 1 and 2, the exemplary platform assembly 10 also includes a biasing means for providing an upward force that counteracts the downward force (or tongue weight) that is applied to the rear of the vehicle 100 by the platform assembly 10 and the towed implement. Such an upward force is not intended to fully counteract the downward force applied to the rear of the vehicle 100 by the platform assembly 10 and the towed implement, but rather only to counteract a portion of the force and reduce the load on the rear of the vehicle 100.

In this exemplary embodiment, the biasing means is comprised of a spring 40 and an associated handle 42 for manipulating the spring 40. As best shown in FIG. 1, the handle 42 is also pivotally connected to the bracket 12. Specifically, the clevis pin 36 mentioned above passes not only through the hole 20a defined by the first support member 20, through the tube section 31 of the first tow bar 30, and through the hole 22a defined by the second support member 22, but further extends through a hole 42a defined by the handle 42, where it is then secured by the washer 49 and the cotter pin 50. As such, the handle 42 can rotate about the horizontal axis defined by the clevis pin 36.

The spring 40 is connected, at one end, to a hole 42c in a lower portion of the handle 42, which is positioned below the tow bars 30, 32. At the opposite end, the spring 40 is connected to the frame 14, such that the spring 40 extends along a diagonal axis between the handle 42 and the frame 14. When installed, the spring 40 is compact and unstretched. However, by rotating the handle 42 downward (counterclockwise in FIG. 1), the spring 40 is stretched, increasing the potential energy in the spring 40. With respect to the rotational movement of the handle 42 and the stretching of the spring 40, the handle 42 can be locked into a second position in which the spring 40 is stretched by a pin or other mechanical means. For instance, in this exemplary embodiment, a locking pin 44 is inserted through a second hole 22b defined through the second support member 22, through a slot 42b defined by the handle 42, and then through a hole 24b defined by the third support member 24. The locking pin 44 is then secured in place by a washer 53 and a cotter pin 54 on an outer surface of the second support member 22 and by another washer 55 and a cotter pin 56 on an outer surface of the third support member 24. This effectively locks the handle 42 into the second position in which the spring 40 is stretched. However, the slot 42b defined by the handle 42 accommodates some limited rotation of the handle 42 about the horizontal axis defined by the clevis pin 36 when the platform assembly 10 is travelling over uneven ground.

Figure 3A:
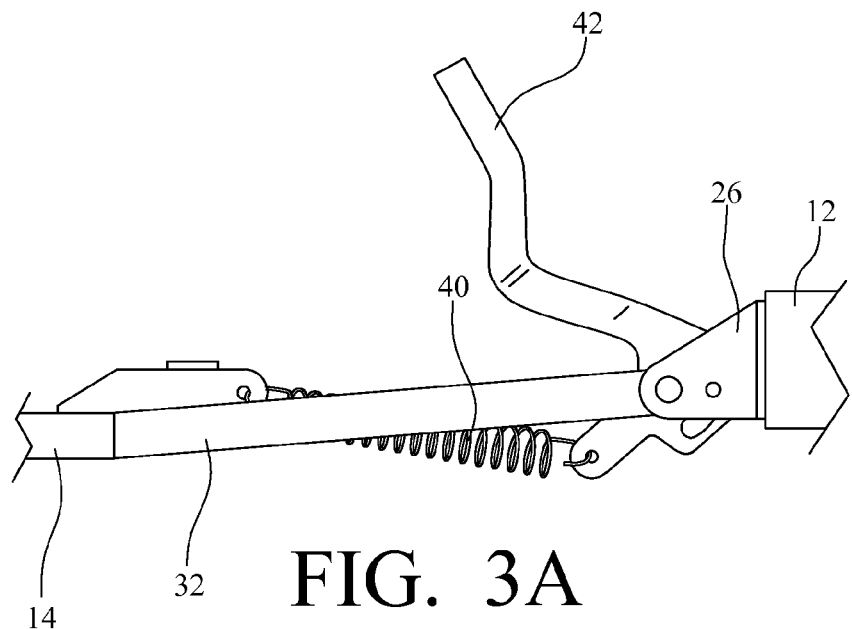
FIG. 3A is a side view of the exemplary platform assembly of FIG. 1 with the handle in a first position.
Figure 3B:
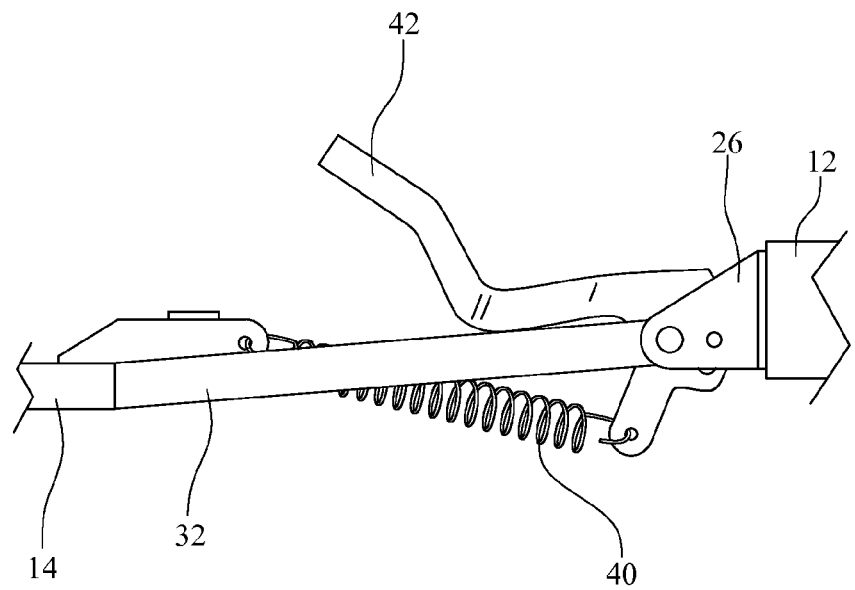
FIG. 3B is a side view of the exemplary platform assembly of FIG. 1 with the handle in a second position.

FIG. 3A is a side view of the exemplary platform assembly of FIG. 1 with the handle in a first position in which the spring 40 is compact and unstretched. FIG. 3B is a side view of the exemplary platform assembly of FIG. 1 with the handle in a second position after the handle has been rotated downward (counterclockwise in FIG. 3B), such that the spring 40 is stretched, increasing the potential energy in the spring 40. As a result of the stretching of the spring 40 in this manner, an upward force is applied at the bracket 12 where the platform assembly 10 is connected to the vehicle 100. This upward force counteracts the downward force (or tongue weight) applied to the rear of the vehicle 100 by the platform assembly 10 and the towed implement. In other words, the tongue weight that is applied to the vehicle 100 as a result of the connection of the platform assembly 10 and the towed implement is effectively reduced.

As mentioned above, the slot 42b defined by the handle 42 accommodates some limited rotation of the handle 42 about the horizontal axis defined by the clevis pin 36. With respect to this feature, it should also be noted that when a vehicle travels over the crest of a hill (or, in the case of a mower, is loaded onto a trailer), the spring 40 will no longer be extended, but will return to its compressed state. Furthermore, as the vehicle travels over the crest of a hill, with the rear of the vehicle angled downward and the front of the frame 14 angled upward, the spring 40 could be forced into itself. Since the slot 42b defined by the handle 42 accommodates some limited rotation of the handle 42, such rotation also prevents the spring 40 from bearing the compressed load.

Figure 4:
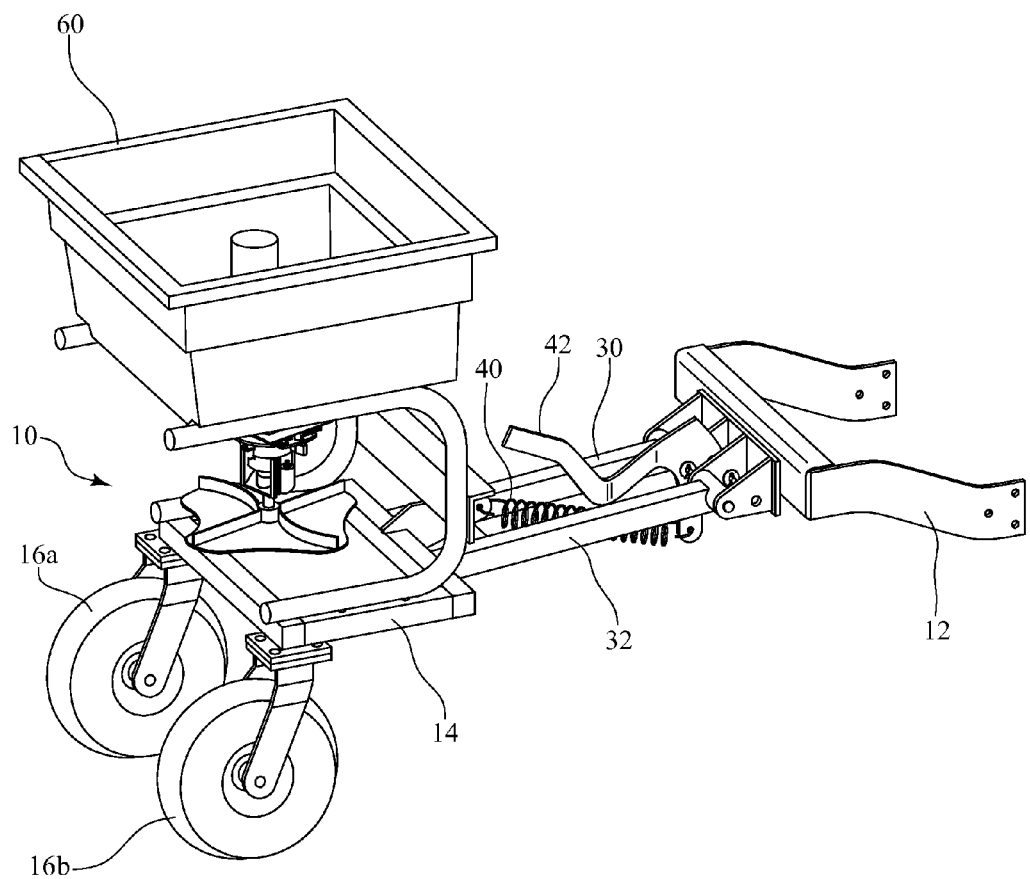
FIG. 4 is a perspective view of an exemplary platform assembly identical to that of FIG. 1, but illustrating a broadcast spreader as the towed implement being supported on the frame of the platform assembly.

FIG. 4 is a perspective view of an exemplary platform assembly identical to that of FIG. 1, but illustrating a broadcast spreader 60 as the towed implement being supported on the frame 14 of the platform assembly 10.

Figure 5:
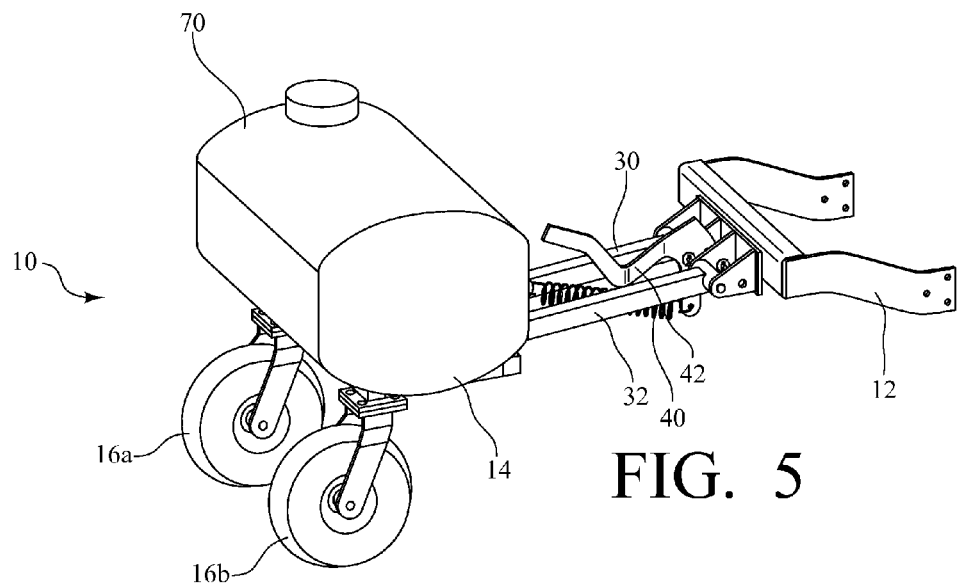
FIG. 5 is a perspective view of an exemplary platform assembly identical to that of FIG. 1, but illustrating a sprayer as the towed implement being supported on the frame of the platform assembly.

FIG. 5 is a perspective view of an exemplary platform assembly identical to that of FIG. 1, but illustrating a sprayer 70 as the towed implement being supported on the frame 14 of the platform assembly 10.

Figure 6:
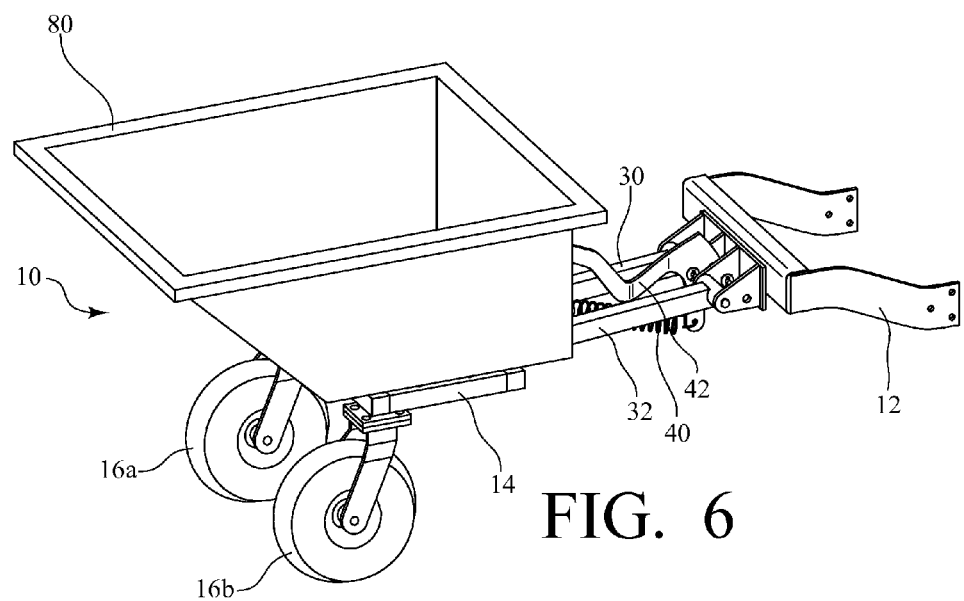
FIG. 6 is a perspective view of an exemplary platform assembly identical to that of FIG. 1, but illustrating a utility cart bed as the towed implement being supported on the frame of the platform assembly.

FIG. 6 is a perspective view of an exemplary platform assembly identical to that of FIG. 1, but illustrating a utility cart bed 80 as the towed implement being supported on the frame 14 of the platform assembly 10.

One of ordinary skill in the art will also recognize that additional embodiments and configurations are also possible without departing from the teachings of the present invention or the scope of the claims which follow. This detailed description, and particularly the specific details of the exemplary embodiment disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A platform assembly for a towed implement, comprising:
    a bracket for securing the platform assembly to a vehicle;
    a frame connected to the bracket for supporting the towed implement;
    one or more wheels connected to the frame for contacting the underlying ground surface;
    a biasing means for providing an upward force that counteracts a downward force applied to the rear of the vehicle by the platform assembly and the towed implement; and
    at least two tow bars that extend from the frame and are connected to the bracket;
    wherein the bracket includes two pairs of rearwardly extending support members, each pair of support members effectively forming a shackle, and wherein a first tow tube extends from the frame and terminates in a tube section which is placed between and connected to one pair of support members by a clevis pin, and wherein a second tow tube extends from the frame and terminates in a second tube section which is placed between and connected to a second pair of support members by another clevis pin.

2. The platform assembly as recited in claim 1, in which the biasing means includes a spring.

3. The platform assembly as recited in claim 2, wherein the biasing means further includes a handle that is pivotally connected to the bracket, with the spring connected, at one end, to a lower portion of the handle, and, at an opposite end, to the frame, such that the spring extends along a diagonal axis between the handle and the frame;
    wherein, by rotating the handle, the spring is stretched, increasing the potential energy in the spring and applying the upward force at the bracket.

4. A platform assembly for a towed implement, comprising:
    a bracket for securing the platform assembly to a vehicle;
    a frame connected to the bracket for supporting the towed implement;
    one or more tow bars that extend from the frame and are connected to the bracket;
    one or more wheels connected to the frame for contacting the underlying ground surface;
    a handle that is pivotally connected to the bracket; and
    a spring connected, at one end, to a lower portion of the handle, and, at an opposite end, to the frame, such that the spring extends along a diagonal axis between the handle and the frame in a substantially parallel relationship to the one or more tow bars;
    wherein, by rotating the handle, the spring is stretched, increasing the potential energy in the spring and providing an upward force at the bracket that counteracts a downward force applied to the rear of the vehicle by the platform assembly and the towed implement.

5. The platform assembly as recited in claim 4, wherein the bracket includes two pairs of rearwardly extending support members, each pair of support members effectively forming a shackle, and wherein a first tow tube extends from the frame and terminates in a tube section which is placed between and connected to one pair of support members by a first clevis pin, and wherein a second tow tube extends from the frame and terminates in a second tube section which is placed between and connected to a second pair of support members by another clevis pin.

6. The platform assembly as recited in claim 5, wherein the first clevis pin also extends through a hole defined by the handle, such that the handle rotates about a horizontal axis defined by the first clevis pin.

7. The platform assembly as recited in claim 4, wherein the bracket includes multiple rearwardly extending support members, and further comprising a locking pin, wherein the handle defines a slot, and wherein the locking pin passes through a hole defined through one of the support members, through the slot defined by the handle, and then through a hole defined by another of the support members, locking the handle into a position in which the spring is stretched, while the slot defined by the handle still accommodates limited rotation of the handle.

8. The platform assembly as recited in claim 6, and further comprising a locking pin, wherein the handle defines a slot, and wherein the locking pin passes through a hole defined through one of the support members, through the slot defined by the handle, and then through a hole defined by another of the support members, locking the handle into a position in which the spring is stretched, while the slot defined by the handle still accommodates limited rotation of the handle about the about the horizontal axis defined by the first clevis pin.

9. A combination, comprising:
    a vehicle;
    a towed implement; and
    a platform assembly towed behind the vehicle, including
        a bracket for securing the platform assembly to the vehicle,
        a frame connected to the bracket for supporting the towed implement,
        one or more tow bars that extend from the frame and are connected to the bracket,
        one or more wheels connected to the frame for contacting the underlying ground surface, and
        a biasing means for providing an upward force that counteracts a downward force applied to the rear of the vehicle by the platform assembly and the towed implement, said biasing means including a spring and a handle that is pivotally connected to the bracket, with the spring connected, at one end, to a lower portion of the handle, and, at an opposite end, to the frame, such that the spring extends along a diagonal axis between the handle and the frame in a substantially parallel relationship to the one or more tow bars, wherein, by rotating the handle, the spring is stretched, increasing the potential energy in the spring and applying the upward force at the bracket.

10. A combination, comprising:
    a vehicle;
    a towed implement; and
    a platform assembly towed behind the vehicle, including a bracket for securing the platform assembly to the vehicle, a frame connected to the bracket for supporting the towed implement, at least two tow bars that extend from the frame and are connected to the bracket one or more wheels connected to the frame for contacting the underlying ground surface, and a biasing means for providing an upward force that counteracts a downward force applied to the rear of the vehicle by the platform assembly and the towed implement;

wherein the bracket includes two pairs of rearwardly extending support members, each pair of support members effectively forming a shackle, and wherein a first tow tube extends from the frame and terminates in a tube section which is placed between and connected to one pair of support members by a clevis pin, and wherein a second tow tube extends from the frame and terminates in a second tube section which is placed between and connected to a second pair of support members by another clevis pin.

\* \* \* \* \*